Oct. 8, 1968 T. D. LODE 3,405,266
SUBATOMIC PARTICLE DETECTOR BY MEANS OF PRODUCING
SOLIDIFIED TRACKS IN A LIQUID
Filed Dec. 4, 1964
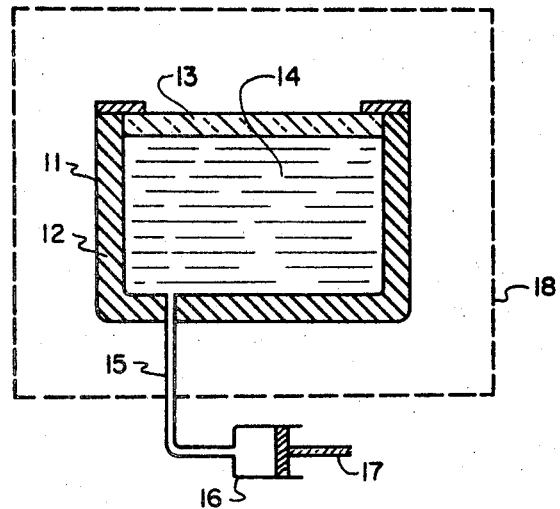
INVENTOR
TENNY D. LODE

United States Patent Office 3,405,266
Patented Oct. 8, 1968

3,405,266
SUBATOMIC PARTICLE DETECTOR BY MEANS OF PRODUCING SOLIDIFIED TRACKS IN A LIQUID
Tenny D. Lode, 4925 Sherwood Road,
Madison, Wis. 53711
Filed Dec. 4, 1964, Ser. No. 416,088
5 Claims. (Cl. 250—83)

ABSTRACT OF THE DISCLOSURE

This disclosure shows a particle detector for the detection and measurement of the passages and paths of individual subatomic particles. In one form, a liquid at a controlled temperature is placed in an unstable supercooled state by a change in pressure. Preferential solidification will then take place along the paths of charged subatomic particles, thereby indicating these paths.

---

This invention relates to the detection of particles such as atomic and nuclear particles and cosmic rays. More particularly, it relates to the detection and measurement of the paths of such particles.

A variety of particle path detectors are known. They include cloud chambers, bubble chambers, spark chambers and photographic emulsions. Each detection method has its particular advantages and disadvantages. In one form of cloud chamber, a gas or vapor is supercooled by sudden expansion. Vapor condensation will occur first along the tracks of charged particles, forming visible vapor trails. The bubble chamber employs a reverse process. The pressure on a liquid is suddenly released, so that it becomes superheated with respect to the reduced pressure. Localized boiling will occur first along the tracks of energetic charged particles. These tracks appear as thin trails of bubbles. Photographic cameras are frequently used to record the trails for subsequent analysis. A disadvantage of the bubble chamber is that it is generally sensitive for only a short period of time, of the order of a few hundredths of a second or less, between the release of pressure and the occurrence of general boiling.

An object of the present invention is to provide a novel means for the detection and measurement of particle paths.

In a particular form of the present invention, a liquid is brought to a supercooled state by a change in pressure. For a short interval of time, between the pressure change causing supercooling and the onset of general solidification, local solidified tracks will form along the paths of atomic and other particles.

In the drawing:
The figure is a section and schematic view of one form of the invention.

Referring now to the drawing, chamber 11 includes body 12 and window 13. Chamber 11 is filled with transparent liquid 14. Pressure line 15 extends from the interior of chamber 11 to cylinder 16, which is fitted with piston 17. Window 13 is sealed to body 12 by conventional methods so that chamber 11 is tightly sealed except for line 15. A temperature stabilizing enclosure 18, indicated by the dotted line in the drawing, surrounds chamber 11 so as to maintain chamber 11 and liquid 14 at a desired temperature.

It is known that the freezing point of a liquid, or the melting point of a solid, is generally a function of the applied pressure. For example, the freezing point of water is depressed approximately 1° C. by a pressure increase of 100 atmospheres. This depression of the freezing point is essentially proportional to the absolute pressure, until a depression of 20° C. is reached at approximately 2,000 atmospheres pressure. Water may be compressed to 200 atmospheres pressure and cooled to −2° C. while remaining in the liquid state. If the pressure is suddenly released, the water will become supercooled and unstable in the liquid state. In a short period of time, the supercooled water will become a mixture of ice and water at 0° C. The heat of fusion released by the partial freezing will have warmed the entire mixture to zero degrees C.

Water expands upon freezing, and its freezing point is lowered by increased pressures. Hence, as described above, a transition from the normal liquid state into the supercooled liquid state may be made by reducing the pressure. Liquids which contract upon freezing will generally have their freezing points raised by increased pressure. In such cases, a transition from a normal liquid state to the supercooled liquid state may be made by increasing the pressure.

In the structure of the drawing, chamber 11 is filled with liquid 14 which may be placed in an unstable supercooled state by the pressure variation process described above. The choice of liquid will depend upon the particular application. As in the case of conventional bubble chambers, liquid hydrogen may be used in instances where simple proton targets are desired within the detection region. The temperature of the entire apparatus is stabilized by enclosure 18. The application and removal of pressure to piston 17 will allow liquid 14 to be stabilized first in the normal liquid state and then suddenly changed to the unstable supercooled state. Solidification tracks in liquid 14 may then be observed through window 13. For contrast, it may be desirable to darken the interior walls of chamber 11 and to shine light into chamber 11.

The local solidification of an unstable supercooled liquid has been described above as a means for the indication of particle tracks. The reverse process, the localized melting of a superheated solid, may also be used. In this latter case, pressure variation would be used to transfer a solid frame a normal stable solid state into an unstable superheated state. Localized melting will occur first along the tracks of particles, before general melting occurs. The substance may thus be used as a particle detector for the period between the time it is placed in the unstable state and the onset of general melting.

The term "atomic particle" is used in the claims. This term is intended to include a wide variety of particles such as nuclear particles, accelerated particles, cosmic rays, X-rays, and gamma radiation.

What is claimed is:
1. Means for detecting atomic particles including means for placing a substance in an unstable state with respect to a reversible liquid-solid transition, and means for observing the localized initial liquid-solid transition due to passage of said particles.
2. Means for detecting atomic particle paths including means for placing a substance in an unstable state with respect to a reversible liquid-solid transition, and means for observinng the initial liquid-solid transition along said paths.
3. Means for detecting atomic particle paths including a chamber, a substance within said chamber capable of reversible melting and solidification, means for controlling the temperature of said substance, means for causing said substance within said chamber to be in an unstable state with respect to a liquid-solid transition, and means for observing the initial onset of the liquid-solid transition along said paths.
4. Means for detecting atomic particle paths including a chamber, a substance within said chamber capable of reversible melting and solidification, means for controlling the temperature of said substance, means for varying the pressure upon said substance within said chamber, thereby causing it to be in an unstable supercooled liquid state, and means for observing the intial onset of solidification along said paths.

5. Means for detecting atomic particle paths including a chamber, a substance within said chamber capable of reversible melting and solidification, means for controlling the temperature of said substance, means for varying the pressure upon said substance within said chamber thereby causing it to be in an unstable superheated solid state, and means for observing the initial onset of liquification along said paths.

References Cited

UNITED STATES PATENTS

| 2,900,518 | 8/1959 | Good | 250—83 |
| 2,962,592 | 11/1960 | Hoecker et al. | 250—83 |
| 3,233,104 | 2/1966 | Heffan | 250—83 |

ARCHIE R. BORCHELT, *Primary Examiner.*